United States Patent
Xue

(10) Patent No.: US 12,081,625 B2
(45) Date of Patent: Sep. 3, 2024

(54) SESSION BASED DATA PERSISTENCY

(71) Applicant: SAP SE, Walldorf (DE)

(72) Inventor: Zhongyuan Xue, McLean, VA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/079,944

(22) Filed: Dec. 13, 2022

(65) Prior Publication Data

US 2024/0195877 A1    Jun. 13, 2024

(51) Int. Cl.
| | |
|---|---|
| G06F 15/16 | (2006.01) |
| G06F 21/62 | (2013.01) |
| H04L 29/06 | (2006.01) |
| H04L 29/08 | (2006.01) |
| H04L 67/142 | (2022.01) |

(52) U.S. Cl.
CPC .................. H04L 67/142 (2013.01)

(58) Field of Classification Search
CPC .............. H04L 67/142; H04L 67/14
USPC ........................................ 709/227
See application file for complete search history.

(56) References Cited

U.S. PATENT DOCUMENTS

| | | | | |
|---|---|---|---|---|
| 6,918,084 | B1* | 7/2005 | Slaughter | H04L 67/51 715/205 |
| 7,788,346 | B2* | 8/2010 | Kumar | G06F 11/1464 707/624 |
| 8,954,475 | B2* | 2/2015 | Seth | G06F 16/00 709/203 |
| 10,505,997 | B2* | 12/2019 | Linden | H04L 65/1083 |
| 10,776,798 | B2* | 9/2020 | Bigbee | H04L 43/062 |
| 11,153,413 | B2* | 10/2021 | Clark | H04L 9/0643 |
| 2002/0143958 | A1* | 10/2002 | Montero | H04L 67/02 709/228 |
| 2002/0152423 | A1* | 10/2002 | McCabe | G06F 9/4493 714/15 |
| 2003/0088545 | A1* | 5/2003 | Subramaniam | G06F 16/34 707/E17.093 |
| 2003/0110266 | A1* | 6/2003 | Rollins | H04L 67/142 709/227 |
| 2013/0124573 | A1* | 5/2013 | Seth | G06F 16/2291 707/E17.011 |
| 2016/0173540 | A1* | 6/2016 | Linden | H04L 67/535 709/228 |
| 2017/0054815 | A1* | 2/2017 | Chen | H04L 67/142 |
| 2018/0219849 | A1* | 8/2018 | Jones | H04L 41/046 |

(Continued)

Primary Examiner — Thu V Nguyen
Assistant Examiner — Golam Mahmud
(74) Attorney, Agent, or Firm — Mintz Levin Cohn Ferris Glovsky and Popeo, P.C.

(57) ABSTRACT

A method, a system, and computer program product for session based data persistency are described. A request to execute, by an executing computing server, a service of an application during a terminal service session initiated by an initiating computing server is received. Current session data including a session header and session attributes is captured. A difference between the current snapshot of the session data and a past snapshot of the session data, generated by the initiating computing server and stored by a persistence layer, is determined. The session attributes stored by the persistence layer are updated based on the difference between the current snapshot of the session data and the past snapshot of the session data to enable execution of the service of the application without requesting reauthentication.

14 Claims, 4 Drawing Sheets

(56) References Cited

U.S. PATENT DOCUMENTS

2019/0354512 A1* 11/2019 Toews .................. G06F 16/972
2021/0042441 A1* 2/2021 Webber ................ G06F 3/0482

* cited by examiner

SESSION BASED DATA PERSISTENCY

TECHNICAL FIELD

The subject matter described herein relates generally to data persistency and more specifically to session based data persistency for a state machine associated with a distributed data processing system.

BACKGROUND

A session for accessing an online service can be initiated by an authenticated user. The session is usually maintained on the server side, such as at an application server node of a cluster of application server nodes. At an upper layer, a load balancer can evenly distribute incoming requests or traffic, from multiple user devices, to the cluster of server nodes. A user device can log on to the system by having initial services executed on an executing sever node. At a later time, the load balancer can direct the requests from the same user device to another (second) server node. The newly redirected requests received from the user device cannot be fulfilled because the executing server node does not have the user session (authentication) information and can request the user device to login again, which can be inconvenient for a user of the user device.

SUMMARY

Systems, methods, and articles of manufacture, including computer program products, are provided for session based data persistency. In one aspect, there is provided a computer-implemented method including: receiving, by one or more processors of an executing computing server, a request to execute a service of an application during a terminal service session initiated by an initiating computing server; capturing, by the one or more processors, session data including a session header and session attributes, the session data being associated with a session state at the executing computing server and including a current snapshot of the session data at the executing computing server; determining, by the one or more processors, a difference between the current snapshot of the session data and a past snapshot of the session data stored by a persistence layer, the past snapshot of the session data being generated by the initiating computing server; and updating, by the one or more processors to the persistence layer, the session attributes stored by the persistence layer based on the difference between the current snapshot of the session data and the past snapshot of the session data to enable execution of the service of the application without requesting reauthentication.

In some variations, one or more features disclosed herein including the following features can optionally be included in any feasible combination. In some implementations, updating, by the one or more processors, the session attributes stored by the persistence layer is performed asynchronously with executing the service during the terminal service session. In some implementations, the computer-implemented method can further include generating, by the one or more processors, a clone of the session data. In some implementations, the computer-implemented method can further include converting, by the one or more processors, the clone of the session data into a first binary object; generating, by the one or more processors, a series including the first binary object and a second binary object; and generating, by the one or more processors, an instruction to update the session attributes stored by the persistence layer by using the series. In some implementations, the computer-implemented method can further include retrieving, by the one or more processors, at least one portion of the session data by loading the terminal service session from the persistence layer and by attaching the at least one portion of the session data to the request. In some implementations, the computer-implemented method can further include determining, by the one or more processors, that the session attributes are included in a whitelist of modifiable session attributes and excluded from a blacklist of the modifiable session attributes. In some implementations, the past snapshot of the session data was generated by the initiating computing server that processed user credentials to initiate the terminal service session.

In another aspect, a non-transitory computer-readable storage medium including programming code, which when executed by at least one data processor, causes operations including: receiving a request to execute, by an executing computing server, a service of an application during a terminal service session initiated by an initiating computing server; capturing session data including a session header and session attributes, the session data being associated with a session state at the executing computing server and including a current snapshot of the session data at the executing computing server; determining a difference between the current snapshot of the session data and a past snapshot of the session data stored by a persistence layer, the past snapshot of the session data being generated by the initiating computing server; and updating, by the one or more processors to the persistence layer, the session attributes stored by the persistence layer based on the difference between the current snapshot of the session data and the past snapshot of the session data to enable execution of the service of the application without requesting reauthentication.

In some variations, one or more features disclosed herein including the following features can optionally be included in any feasible combination. In some implementations, updating the session attributes stored by the persistence layer is performed asynchronously with executing the service during the terminal service session. In some implementations, the operations further include: generating a clone of the session data. In some implementations, the operations further include: converting the clone of the session data into a first binary object; generating a series including the first binary object and a second binary object; and generating an instruction to update the session attributes stored by the persistence layer by using the series. In some implementations, the operations further include: retrieving at least one portion of the session data by loading the terminal service session from the persistence layer and by attaching the at least one portion of the session data to the request. In some implementations, the operations further include: determining that the session attributes are included in a whitelist of modifiable session attributes and excluded from a blacklist of the modifiable session attributes. In some implementations, the past snapshot of the session data was generated by the initiating computing server that processed user credentials to initiate the terminal service session.

In another aspect, a system including: at least one data processor; and at least one memory storing instructions, which when executed by the at least one data processor, cause operations including: receiving a request to execute, by an executing computing server, a service of an application during a terminal service session initiated by an initiating computing server; capturing session data including a session header and session attributes, the session data being associated with a session state at the executing computing server and including a current snapshot of the session data at the executing computing server; determining a difference between the current snapshot of the session data and a past snapshot of the session data stored by a persistence layer, the past snapshot of the session data being generated by the initiating computing server; and updating, by the one or more processors to the persistence layer, the session attributes stored by the persistence layer based on the difference between the current snapshot of the session data and the past snapshot of the session data to enable execution of the service of the application without requesting reauthentication.

In some variations, one or more features disclosed herein including the following features can optionally be included in any feasible combination. In some implementations, updating the session attributes stored by the persistence layer is performed asynchronously with executing the service during the terminal service session. In some implementations, the operations further include: generating a clone of the session data. In some implementations, the operations further include: converting the clone of the session data into a first binary object; generating a series including the first binary object and a second binary object; and generating an instruction to update the session attributes stored by the persistence layer by using the series. In some implementations, the operations further include: retrieving at least one portion of the session data by loading the terminal service session from the persistence layer and by attaching the at least one portion of the session data to the request. In some implementations, the operations further include: determining that the session attributes are included in a whitelist of modifiable session attributes and excluded from a blacklist of the modifiable session attributes. In some implementations, the past snapshot of the session data was generated by the initiating computing server that processed user credentials to initiate the terminal service session.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a non-transitory computer-readable or machine-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While particular features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show particular aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
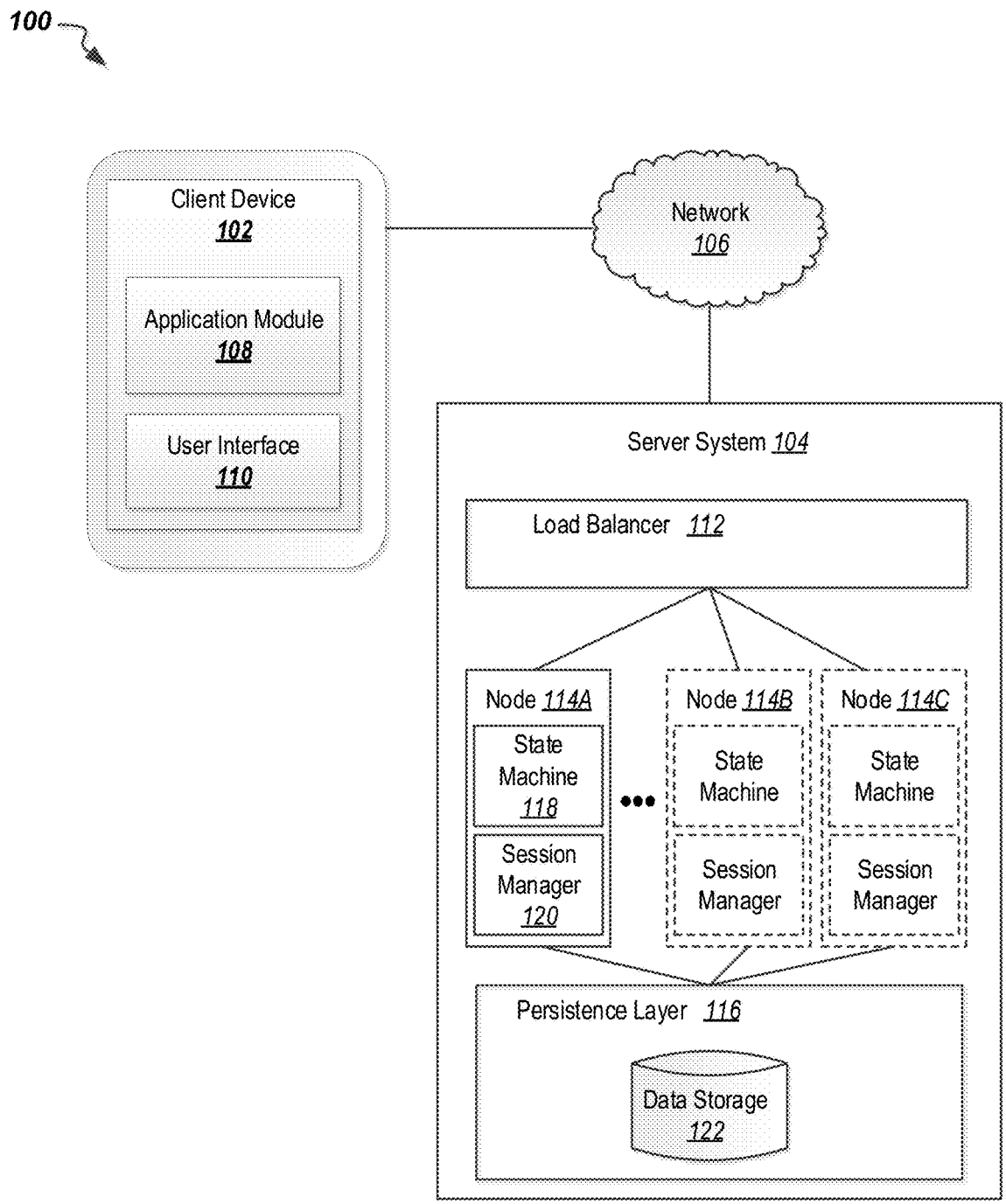
FIG. 1 depicts a diagram of an example system, in accordance with some example implementations.

Implementations of the present disclosure are generally directed to software deployment and more specifically to a session persistence service for a cluster of stateful server nodes. In one implementation, a stateful server is one that retains data relative to the device making the request. This can typically be seen when a user is authenticated to access the services and data provided by the stateful server. It is preferable that once authenticated, the user can issue multiple requests without having to be re-authenticated for each request. In one implementation of the present disclosure, the cluster of stateful server nodes can execute services distributed by a load balancer that can direct a first service during an authenticated session to a first server node and can direct a second service during the authenticated session to a another executing server node. The execution of services for a client device, by multiple server nodes, during a session using a single authentication can be challenging.

In a traditional process, if the server nodes are stateless, typically where the client device instead of the server keeps track of the session, a token (e.g., a JSON Web token) can be initially issued for a client device requesting services during a session. For all successive requests, during the initiated session, the token can be sent back to the server nodes from the browser. Any stateless server node can serve the request by getting the client device information from the token itself. However, widely publishing the token to support stateless servers can trigger security issues.

Another traditional process can provide an option to execute multiple services for an authenticated client device during a session where a single authentication can be based on a session replication mechanism. The session replication mechanism can include several drawbacks that can be related to connectivity issues, memory usage and data processing efficiency. For example, the session replication mechanism can use network layer cluster messages and replicate the whole session to stateful server nodes. The replicated session only exists in memory. If a server node that processes initial service requests goes down, newly created session attributes can be lost before being replicated to other server nodes. The session replication can be implemented if all the attributes in the session are serializable. Serialization can be difficult to be implemented in a legacy system, because usually the session is large and the attributes are not guaranteed to be serializable. The session replication mechanism can use a replication of the whole session, which might not be practical for applications with long sessions. The session replication mechanism can suffer degraded performance with an increasing number of service requests from concurrent client devices. The session replication mechanism can include replication of an entire session, without being able to derive replication from a variation (delta) of session data, which can be associated with major memory consumption. Traditional session replication mechanism does not use persistent storage, such that loss of connectivity with a server can lead to loss of data.

To avoid the drawbacks of traditional process described above, a server cluster can be used using stateful servers with a different protocol to allow transitioning from one server to another during a single session. Using the described implementations herein, a first (initial) stateful server node can initiate a service and at a later time, within the same terminal service session, a service request can be received by a second (executing) stateful server node. The executing stateful server node can capture a current snapshot of the session data. The current snapshot of the session data is compared to a past snapshot of the session data stored by a data storage of a persistence layer to identify differences. The session attributes, stored by the cache, can be updated based on the difference between the current snapshot of the session data and the past snapshot of the session data. As such, in some implementations of the current subject matter, the distributed data processing system can provide session based data persistency for handling service requests with single authentication sessions in a processing efficient manner that protects data privacy. The described implementations are configurable and highly scalable in a multi-tenant cloud application. The described implementations, can be implemented in server systems that are configured to provide services to large numbers (e.g., hundreds of thousands) of concurrent users. As another advantage of the described implementations, a whitelist of modifiable session attributes can be used to indicate a configuration of session attributes that can be persisted between multiple computing servers (e.g., client authentication information and client preferences) to minimize system storage and optimize the server performance. FIG. 1 depicts a diagram of an example system 100, for a session persistence mechanism during an authenticated session requiring a single authentication in a stateful server cluster, in accordance with some example implementations. The example system 100 can include a client device 102, a server system 104, and a network 106. The client device 102 can be associated with an entity authorized to use an online application hosted by the server system 104. In the depicted example, the client device 102 includes an application module 108 and a user interface 110. The application module 108 can interact with an online application that is hosted by the server system 104 during an authenticated session requiring a single authentication. For example, the application module 108 can be configured to enable transmission of user authentication information and service requests during an authenticated session requiring a single authentication. The user interface 110 can enable entry of a user input including the user authentication information and selection of the service requests.

The client device 102 can be and/or include any type of processor and memory based device, such as, for example, cellular phones, smart phones, tablet computers, laptop computers, desktop computers, workstations, personal digital assistants (PDA), network appliances, cameras, enhanced general packet radio service (EGPRS) mobile phones, media players, navigation devices, email devices, game consoles, or an appropriate combination of any two or more of these devices or other data processing devices. Even though, not illustrated, in some implementations, multiple client devices 102 including different computing system configurations, such as different operating systems, different processing capabilities, different hardware components, and/or other differences can concurrently request services, during authenticated sessions, from the server system 104. As shown in FIG. 1, the client device 102 can be communicatively coupled with the server system 104 during an authenticated session, via the network 106. It should be appreciated that the network 106 can be any wired and/or wireless network including, for example, a public land mobile network (PLMN), a local area network (LAN), a wide area network (WAN), the Internet, a cellular network, a telephone network (e.g., PSTN) or an appropriate combination thereof connecting any number of communication devices, mobile computing devices, fixed computing devices, server systems, and/or the like. The client device 102 can include any combination of fixed and variable computing components.

The server system 104 can include a distributed data processing system. The server system 104 can include a load balancer 112, a plurality of computing servers 114A, 114B, 114C and a persistence layer 116. The load balancer 112 can be configured to securely manage multicloud workloads, by identifying which of the computing servers (or computing nodes) 114A, 114B, 114C can execute requested services without generating conflicts with ongoing or scheduled services and adaptively directing the requested services to the computing servers 114A, 114B, 114C to reduce latency, improve the reliability, and efficiency of service execution during authenticated sessions with secure session persistence.

The load balancer 112 can be configured to adapt the capacity of the server system 104 for scaling data, concomitantly connected computing servers 114A, 114B, 114C, and workload through a securely integrated relationship of multi cloud services and computing servers 114A, 114B, 114C. In some implementations, the load balancer 112 can load-balance incoming service requests according to a round-robin distributions scheme, regulated relative to ongoing and/or scheduled services to adaptively direct the requested services to the computing servers 114A, 114B, 114C, to which various service operations are directed in a sequential and continuous manner. In some cases, trigger automatic assignment is initiated by carrying out a series of matching, loading and invocation steps. Specifically, a set of workload or application attributes such as "Application Name"="MySQL" are determined from the initial request. Then, using the set of application attributes associated with each server or computing node 114A, 114B or 114C, some or all of those attributes from the request can be used to match attributes found in an application matching profile or other data structure associated with the computing servers 114A, 114B or 114C. The matching profile codifies attributes that can be matched (e.g., exactly and completely matched or just partially and/or fuzzy matched) to a given set of session attributes. Once the session attributes are matched, the session attributes are converted to a storable format (e.g., one or more binaries). The session attributes can include a key-value pair. The value can be a complex object (e.g., a Java object) that is in a format that cannot be stored by the data storage. The value can be converted to a binary object for storage using a designed algorithm that does not rely on a source code (e.g., Java) of the original value format. After the value is converted to a binary format, the values of multiple session attributes can be serialized to include all session data. For example, for matching on "Application Name"="MySQL", there might be a partial match for "MySQL-Version1.0.1", or "MySQL-Version1.0.2", or "MySQL-Version2.0.1", etc. Using such name matching and/or using any of a wide range of selection factors, a set of available binaries are analyzed to identify a candidate binary (e.g., "MySQL-Version2.0.1") that in turn becomes a candidate binary that is to be invoked in the server system 104. Once a computing server 114A, 114B, 114C (candidate binary) has been identified and verified to be compatible with the requested service, the request is automatically transmitted to the identified computing server 114A, 114B, 114C.

The computing servers 114A, 114B, 114C can be configured to receive and process requested services. Each of the computing servers 114A, 114B, 114C includes a state machine 118 and a session manager 120. The state machine 118 can be configured to track, via state transitions, one or more changes to a session that can be managed by a session manager 120. The session manager 120 of a computing server 114A, 114B, 114C selected to execute a portion of the services during the authenticated session can be configured to update session serialization data including a session header (e.g., session key) and/or one or more session attributes (e.g., session values) during the execution of the assigned portion of the services. The session header can include general information about the session including a time stamp associated with a most recent time the online application was accessed during the authenticated session. The session attributes can include general information about the session, such as a piece of data associated with an authenticated session, or a user information of the user originating the requests during the session. The attributes of the session can vary by application based on settings determined by an application administrator. For example, the session attributes can include (static and variable) values that indicate a user role during the session, session objects, and links related to session objects. It should be appreciated that the changes to the data stored at the server system 104, for example, in the persistence layer 116, can be triggered by one or more queries from the client device 102. For instance, the client device 102 can send, via the network 140, one or more queries to the server system 104 that adds, removes, and/or updates data from data storage 122, in response to execution of services at the computing server 114A, 114B, 114C. The changes to the data in the data storage 122 can trigger one or more state transitions at the state machine 118.

In some implementations of the current subject matter, the session manager 120 can be configured to process session data associated with the state machines 118 at the respective computing server 114A, 114B, 114C included in the server system 104. For example, the session manager 120 can generate and handle data associated with the state machine 118 associated with the computing server 114A, 114B, 114C. The session manager 120 can generate data including one or more snapshots of the state machine 118 representative of a state of the computing server 114A, 114B, 114C, at various checkpoints (e.g., triggered by changes to the session data) during an authenticated session. The snapshots of the state machine 118 can be transmitted to the persistence layer 116 to be stored in a data storage 122, for example, in one or more fixed size and/or variable size data pages.

The persistence layer 116 can include a storage layer, where data including session data may be stored and/or queried using instructions, such as commands and/or the like. The session data may be transiently stored in the persistence layer 116 (e.g., a page buffer or other type of temporary persistency layer or a database extension layer), which may write the data, in the form of storage pages, to a data storage 122 (including one or more of a database and/or cache), for example via an input/output component of the server or computing servers 114A, 114B, 114C. The data storage 122 may include one or more physical storage media or devices (e.g. hard disk drives, persistent flash memory, random access memory, optical media, magnetic media, and the like) configured for writing data for longer term storage. The cache can include a cache memory drive configured to read session serialization data. The cache can have a higher access speed than the database.

According to some implementations of the current subject matter, the session manager 120 can include an access manager and a session attribute controller. The access manager can be configured to provide access to the online application and to the data stored in the data storage 122 during an authenticated session. For example, the access manager can support read operations and/or write operations accessing one or more data in the data storage 122. It should be appreciated that a write operation can be performed, for example, at a checkpoint, in order to write at least a portion of a snapshot of the state machine 118 to one or more data, thereby preserving the state of the respective computing server 114A, 114B, 114C at that particular point in time. Alternatively and/or additionally, a read operation can be performed in order to read at least a portion of the snapshot of the state machine 118 from the one or more data.

The snapshot of the state machine 118 read from the one or more data can be used to persist an authenticated session or to restore the data stored at the same or a different computing server 114A, 114B, 114C, for example, in the data storage 122, to the state at the checkpoint. For example, if a service request is served from another computing server 114A, 114B, 114C (different from an earlier computing server 114A, 114B, 114C), as the computing server 114A, 114B, 114C does not find the session in memory, it can try to load the session from the persistence layer 116 identified by the session identifier included in the request.

The storage of the data storage 122 included in the persistence layer 116 can be highly available. In some implementations of the current subject matter, the data storage 122 can be a key-value store configured to store data in the form of one or more key-value pairs (KVPs). For instance, the data storage 122 can be a hybrid key-value store in which data records that do not exceed a threshold size (e.g., 2 kilobytes and/or a different size) are stored in an in-memory key-value store and data records that do exceed the threshold size (e.g., 2 kilobytes and/or a different size) are stored in a secondary data store. It should be appreciated that an in-memory key-value store can be implemented using any type of persistence that supports low latency access including, for example, random access memory (RAM) and/or the like. Meanwhile, the secondary data store can be implemented using any type of persistence that supports high capacity storage including, for example, hard disk and/or the like. The cache can be included in the data storage 122 to reduce the storage load of the data storage 122.

In some implementations of the current subject matter, even if a computing server 114A in the server system 104 becomes unavailable (goes down or gets rebounced) due to one or more factors (e.g., maintenance or connectivity issues), another computing server 114B can be identified by the load balancer 112 to load the session from the data storage 122 and to serve a pending request, seamlessly for the client device 102. Using the described server system 104, the client device 102 does not experience any difference when the load balancer 112 redirects service requests from a first (initiating) computing server 114A that completed a previous service (e.g., session authentication service) to a second (executing) computing server 114B assigned by the load balancer 112 to complete a subsequent service during the authenticated session, using related state data stored by the persistence layer 116, without requiring additional authentications. The processes performed by any of the computing servers 114A, 114B, 114C included in the server system 104 are further described in detail with reference to FIG. 2.

Figure 2:
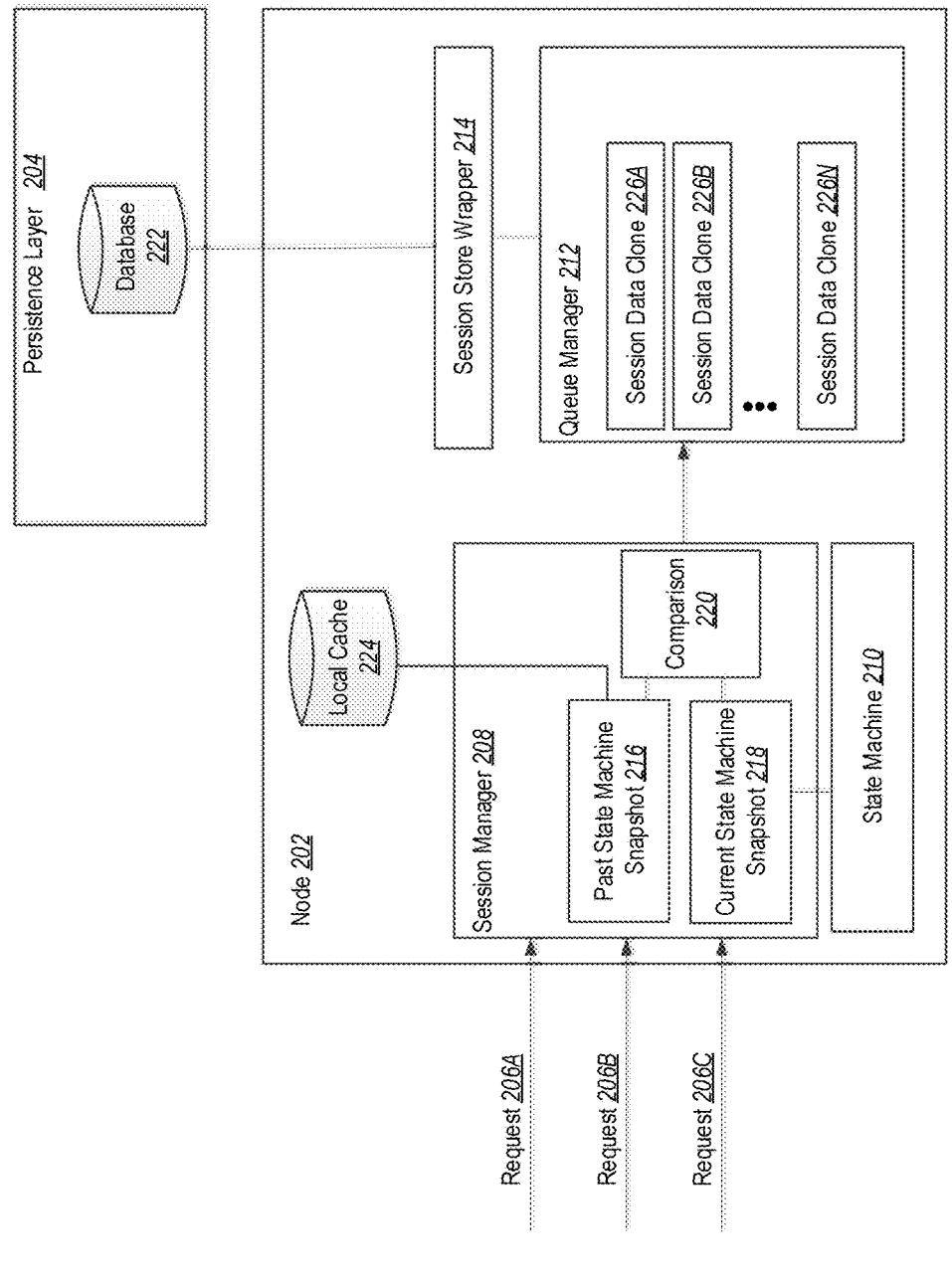
FIG. 2 depicts an example of a session based data persistency, in accordance with some example implementations.

FIG. 2 depicts an example diagram 200 of an interaction between a computing server 202 (e.g., server or computing servers 114A, 114B, 114C described with reference to FIG. 1) and a persistence layer 204 (e.g., persistence layer 116 described with reference to FIG. 1) including a database 222. In some implementations, the example diagram 200 of the interaction between the server or computing server 202 and the persistence layer 204 can enable a session persistency for an authenticated client device, according to some implementations of the current subject matter. The server or computing server 202 receives, during an authenticated session, a set of requests 206A, 206B, 206C to execute services that can be related to an online application.

The server or computing server 202 includes a session manager 208 (e.g., session manager 120 described with reference to FIG. 1), a state machine 210 (e.g., state machine 118 described with reference to FIG. 1), a queue manager 212, a session store wrapper 214, and a local cache 224. The session manager 208 can be configured to communicate with the cache 224 to retrieve past state machine snapshot(s) 216 that were previously sent by the same computing server 202 for storage.

In some implementations, the computing server 202 can determine if the request 206A, 206B, 206C is an initial request in an authenticated session (e.g., by determining existence of a past snapshot of the state machine 216 in a local data storage, such as the cache 224 or the existence of session data in the database 222 of the persistence layer 204). If the request 206A, 206B, 206C is the initial request in an authenticated session, the computing server 202 can generate serialized session data and transmit it to the cache 224. If the server or computing server 202 determines that the request 206A, 206B, 206C is not the initial request in an authenticated session (thereby indicating a past state machine snapshot 216 of the authenticated session already exists being stored within the persistence layer 204 or in the cache 224 of the computing server 202), a current state machine snapshot 218 is generated by the session manager 208.

According to some implementations of the current subject matter, retrieving data associated with the state machine 210 can include traversing the corresponding series of session data to at least identify the session data associated with a particular time point (e.g., most recent time point) of the state machine. The timing of receipt of requests 206A, 206B, 206C dictate the timing of the state machine snapshots. For example, a most recent snapshot of the state machine 216, 218 corresponds to the last request received from a user. The most recent snapshot of the state machine can include all session data of a respective session rather than just a portion of the session data.

The session manager 208 can be configured to compare 220 the current state machine snapshot 218 to the past state machine snapshot 216 of the authenticated session to determine if there are any changes to the session data. The changes between the past and current state machine snapshots can be associated to modified (added, removed or updated) session attributes or modified portions of the session header. If the comparison result 220 includes a state machine snapshot change associated with the authenticated session, the session manager 208 can transmit the comparison result 220 to the queue manager 212 to generate a respective session data clone 226A, 226B, 226C. For example, each time a request 206A, 206B, 206C is received, the session manager 208 can generate a comparison result 220 including a change between a current and a past state machine snapshot. If the comparison result 220 includes changes, the comparison result 220 is sent by the session manager 208 to the queue manager 212. The queue manager 212 of the respective computing server 202 can convert a session data clone (formatted as a Java object) into a binary object (integer). The queue manager 212 can generate a series including multiple binary objects from a respective session data clone 226A, 226B, . . . 226N, as (e.g., the first binary object and one or more additional binary objects). For example, the series (session serialization data object) can include all session attributes identified for modification of session data. The session serialization data object can be wrapped as a future task. The session serialization data object can be transmitted by the queue manager 212 to the session store wrapper 214.

The session store wrapper 214 can asynchronously process the queues (series) received from the queue manager 212 while the session manager responds to the received request(s) 206A, 206B, 206C. The session store wrapper 214 can process the queues in a set order (e.g., in a first come and first serve order that can be rearranged based on one or more prioritizing criteria). The session store wrapper 214 can transmit the session data (as a series of binary data) to the database 222 of the persistence layer 204 for storage. For example, the tasks of the session store wrapper 214 can be translated into removing or inserting session attributes from the allocated session attribute series stored by the database 222 of the persistence layer 204. In case a central data storage includes a cache service is used for storing the session data in the persistence layer 204, the tasks of the session store wrapper 214 can result in API calls to the cache service for updating the session changes (e.g., session attributes) in the persistence layer 204. The configuration of the computing server 202 that enables detached (asynchronous) processing of the tasks, by the session store wrapper 214, in parallel with execution of services requested by the client device as requests, by the session manager 206, avoids session persistence interferences, making the response to requested services to appear seamless on the client device even if some services are executed on a computing server different from an original node, on which the client device was originally authenticated to initiate the session. Further details of the process executed by the computing server 202 are described with reference to FIG. 3.

Figure 3:
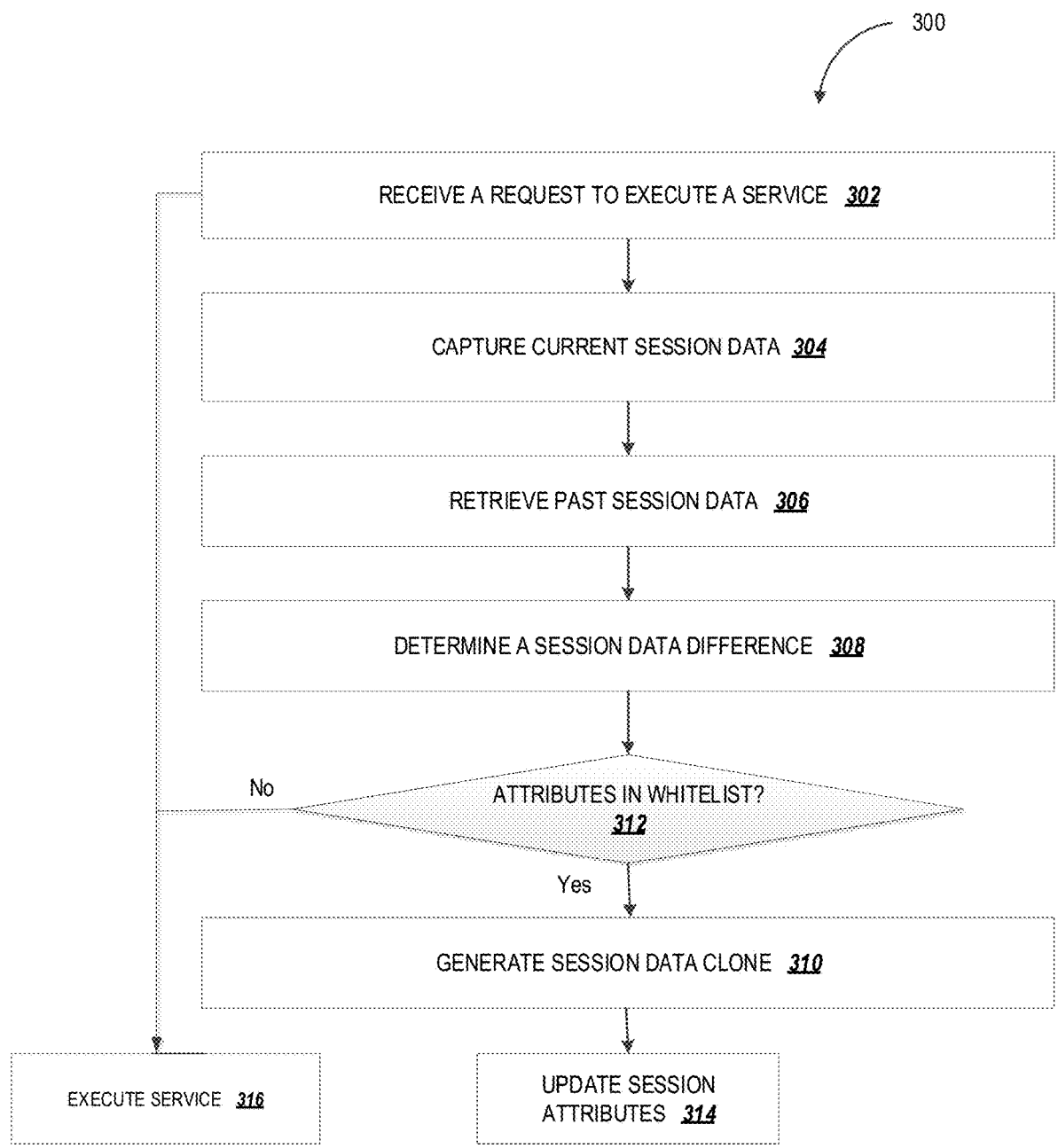
FIG. 3 depicts a flowchart illustrating an example process, in accordance with some example implementations.

FIG. 3 depicts a flowchart illustrating an example of a process 300 for persisting data associated with a state machine representative of a computing server (e.g., computing server 114A, 114B, 114C described with reference to FIG. 1 and/or computing server 202 described with reference to FIG. 2) within a server system (e.g., the server system 104 described with reference to FIG. 1). For example, the example process 300 can be performed by the session manager 120, 208 in order to store session data associated with the state machine at the computing server 114A, 114B, 114C in the server system 104. However, it should be appreciated that the process 300 can be performed to store session data associated with any state machine at any computing server within the server system 104.

At 302, a request to execute a service of an application during a terminal service session initiated by an initiating computing server is received by an executing computing server. The request can be generated by a client device (e.g., the client device 102 described with reference to FIG. 1). The request can be redirected from the initiating computing server to the executing computing server by a load balancer configured to optimize distribution of service processing throughout a network of multiple computing servers. The second computing server can be a computing server of the network of computing servers that initiated an authentication session providing the client device access to services related to an online application hosted by a server system including the network of computing servers.

At 304, session data are captured. The session data includes a session header (metadata including general information about the session including a session identifier, a time stamp associated with a most recent time the online application was accessed during the authenticated session) and session attributes that are mapped to the client device (e.g., authentication information and/or client preferences). The session data can be associated with a session state at the executing computing server and can include a current snapshot of the session data at the executing computing server. The current snapshot of the session data can (automatically and/or in response to a trigger) capture a session state as registered by the first computing server. For example, the current snapshot can include a mapping of session attributes (e.g., physical registers to the specified architected registers). The mapping can include bit positions of the set of session registers corresponding to the session attributes. The current snapshot of the session data can be formatted as a table (e.g., including three dimensions corresponding to session attributes AD).

At 306, a past snapshot of the session data stored by a persistence layer is retrieved by the executing computing server using a session identifier. The past snapshot of the session data can be generated by the second computing server (e.g., after a previous session attribute change or after client device authentication). The past snapshot of the session data can be formatted as a table (e.g., including two dimensions corresponding to session attributes ABC).

At 308, the current snapshot of the session data is compared to the past snapshot of the session data to determine a comparison result including a difference between the snapshots. The difference can be determined by comparing all entries of the current and past snapshots of the session data to identify any potential changes. The comparison result can be formatted as a table (within the context example, the comparison result can include BCD, where session attributes B and C are identified for being removed and session attribute D is identified for being added).

At 310, it is determined whether the session attributes identified to be modified (updated, removed, and/or added) are included in a whitelist of modifiable session attributes. The whitelist of modifiable session attributes can be designed by a server system administrator. The whitelist of modifiable session attributes can indicate a configuration of session attributes that can be persisted between multiple computing servers (e.g., client authentication information and client preferences). Other attempts to modify fixed session attributes (e.g., client independent attributes and/or application function changes) that are not included in the whitelist or are included in a blacklist can be ignored, by the executing computing server, for better system performance and application stability and/or security. The session configuration as defined by the whitelist (defining modifiable session attributes) and the blacklist (defining non-modifiable session attributes) can be externalized (e.g., published to client devices outside the server system).

At 312, in response to determining that the session attributes are included in the whitelist of modifiable session attributes, the comparison result including the modifiable session attributes is sent to a queue manager of the first computing server to generate a clone of the session data. In some implementations, the queue manager of the first computing server can convert the clone of the session data (formatted as a Java object) into a first binary object (integer) having a format that can be stored by a data storage (e.g., database or central cache of a persistence layer). The queue manager of the first computing server can generate a series including the first binary object and one or more additional binary objects, such that the series includes in all session attributes identified for modification.

At 314, session attributes are updated and saved at the persistence layer, where they are available to be accessed using the session identifier at any point during the authenticated session or a subsequent authenticated session, independent of changing the computing server executing the requested services. For example, the session attributes can be updated at the persistence layer according to an instruction generated by the first computing server, the instruction defining the update of the session attributes by using the series.

At 316, the requested service is executed, by the first computing server, asynchronously with updating the session attributes stored by the persistence layer, during the terminal service session. Using the example process 300, a requested service (workload) can be automatically migrated to a different computing server without requiring an additional session authentication.

Figure 4:
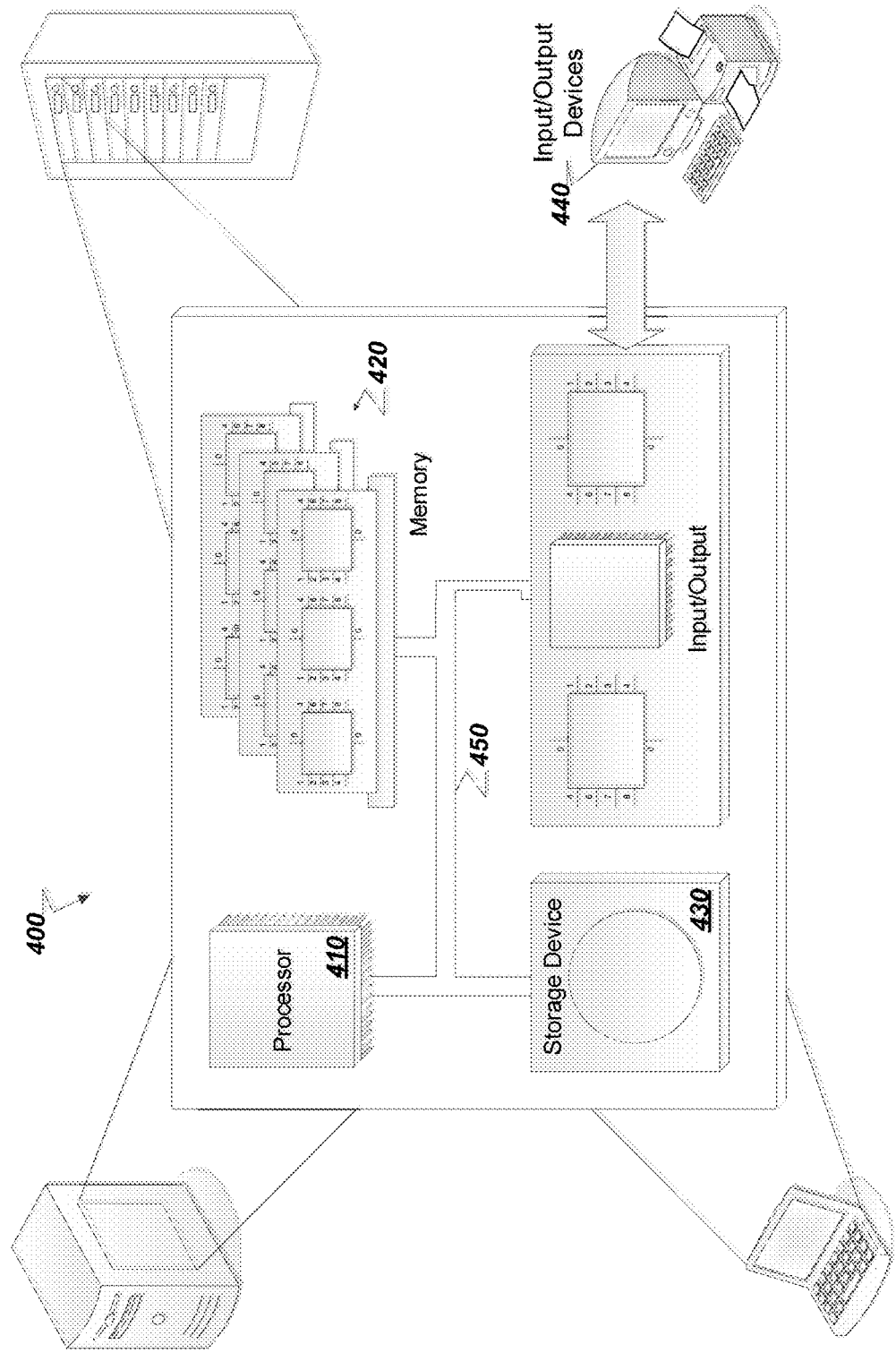
FIG. 4 depicts a block diagram illustrating a computing system, in accordance with some example implementations.

Referring now to FIG. 4, a schematic diagram of an example computing system 400 is provided. The system 400 can be used for automatically addressing software deployment errors, as described in association with the implementations described herein. For example, the system 400 can be included in any or all of the server components discussed herein with reference to FIGS. 1 and 2. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 can be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a particular activity or bring about a particular result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

A number of implementations of the present disclosure have been described. Nevertheless, it will be understood that various modifications can be made without departing from the spirit and scope of the present disclosure. Accordingly, other implementations are within the scope of the following claims.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Further non-limiting aspects or embodiments are set forth in the following numbered examples:

Example 1: A computer-implemented method comprising: receiving, by one or more processors of an executing computing server, a request to execute a service of an application during a terminal service session initiated by an initiating computing server; capturing, by the one or more processors, session data comprising a session header and session attributes, the session data being associated with a session state at the executing computing server and comprising a current snapshot of the session data at the executing computing server; determining, by the one or more processors, a difference between the current snapshot of the session data and a past snapshot of the session data stored by a persistence layer, the past snapshot of the session data being generated by the initiating computing server; and updating, by the one or more processors to the persistence layer, the session attributes stored by the persistence layer based on the difference between the current snapshot of the session data and the past snapshot of the session data to enable execution of the service of the application without requesting reauthentication.

Example 2: The computer-implemented method of example 1, wherein updating, by the one or more processors, the session attributes stored by the persistence layer is performed asynchronously with executing the service during the terminal service session.

Example 3: The computer-implemented method of example 1 or 2, further comprising: generating, by the one or more processors, a clone of the session data.

Example 4: The computer-implemented method of any of examples 1 to 3, further comprising: converting, by the one or more processors, the clone of the session data into a first binary object; generating, by the one or more processors, a series comprising the first binary object and a second binary object; and generating, by the one or more processors, an instruction to update the session attributes stored by the persistence layer by using the series.

Example 5: The computer-implemented method of any of examples 1 to 4, further comprising: retrieving, by the one or more processors, at least one portion of the session data by loading the terminal service session from the persistence layer and by attaching the at least one portion of the session data to the request.

Example 6: The computer-implemented method of any of examples 1 to 5, further comprising: determining, by the one or more processors, that the session attributes are included in a whitelist of modifiable session attributes and excluded from a blacklist of the modifiable session attributes.

Example 7: The computer-implemented method of any of examples 1 to 6, wherein the past snapshot of the session data was generated by the initiating computing server that processed user credentials to initiate the terminal service session.

Example 8: A non-transitory computer-readable storage medium comprising programming code, which when executed by at least one data processor, causes operations comprising: receiving a request to execute, by an executing computing server, a service of an application during a terminal service session initiated by an initiating computing server; capturing session data comprising a session header and session attributes, the session data being associated with a session state at the executing computing server and comprising a current snapshot of the session data at the executing computing server; determining a difference between the current snapshot of the session data and a past snapshot of the session data stored by a persistence layer, the past snapshot of the session data being generated by the initiating computing server; and updating, by the one or more processors to the persistence layer, the session attributes stored by the persistence layer based on the difference between the current snapshot of the session data and the past snapshot of the session data to enable execution of the service of the application without requesting reauthentication.

Example 9: The non-transitory computer-readable storage medium of example 8, wherein updating the session attributes stored by the persistence layer is performed asynchronously with executing the service during the terminal service session.

Example 10: The non-transitory computer-readable storage medium of example 8 or 9, wherein the operations further comprise: generating a clone of the session data.

Example 11: The non-transitory computer-readable storage medium of any of examples 8 to 10, wherein the operations further comprise: converting the clone of the session data into a first binary object; generating a series comprising the first binary object and a second binary object; and generating an instruction to update the session attributes stored by the persistence layer by using the series.

Example 12: The non-transitory computer-readable storage medium of any of examples 8 to 11, wherein the operations further comprise: retrieving at least one portion of the session data by loading the terminal service session from the persistence layer and by attaching the at least one portion of the session data to the request.

Example 13: The non-transitory computer-readable storage medium of any of examples 8 to 12, wherein the operations further comprise: determining that the session attributes are included in a whitelist of modifiable session attributes and excluded from a blacklist of the modifiable session attributes.

Example 14: The non-transitory computer-readable storage medium of any of examples 8 to 13, wherein the past snapshot of the session data was generated by the initiating computing server that processed user credentials to initiate the terminal service session.

Example 15: A system comprising: at least one data processor; and at least one memory storing instructions, which when executed by the at least one data processor, cause operations comprising: receiving a request to execute, by an executing computing server, a service of an application during a terminal service session initiated by an initiating computing server; capturing session data comprising a session header and session attributes, the session data being associated with a session state at the executing computing server and comprising a current snapshot of the session data at the executing computing server; determining a difference between the current snapshot of the session data and a past snapshot of the session data stored by a persistence layer, the past snapshot of the session data being generated by the initiating computing server; and updating, by the one or more processors to the persistence layer, the session attributes stored by the persistence layer based on the difference between the current snapshot of the session data and the past snapshot of the session data to enable execution of the service of the application without requesting reauthentication.

Example 16: The system of example 15, wherein updating the session attributes stored by the persistence layer is performed asynchronously with executing the service during the terminal service session.

Example 17: The system of example 15 or 16, wherein the operations further comprise: generating a clone of the session data.

Example 18: The system of any of examples 15 to 17, wherein the operations further comprise: converting the clone of the session data into a first binary object; generating a series comprising the first binary object and a second binary object; and generating an instruction to update the session attributes stored by the persistence layer by using the series.

Example 19: The system of any of examples 15 to 18, wherein the operations further comprise: retrieving at least one portion of the session data by loading the terminal service session from the persistence layer and by attaching the at least one portion of the session data to the request.

Example 20: The system of any of examples 15 to 19, wherein the operations further comprise: determining that the session attributes are included in a whitelist of modifiable session attributes and excluded from a blacklist of the modifiable session attributes.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method comprising:
    receiving, by one or more processors of an executing computing server, a request to execute a service of an application during a terminal service session initiated by an initiating computing server;
    capturing, by the one or more processors, session data comprising a session header and session attributes, the session data being associated with a session state at the executing computing server and comprising a current snapshot of the session data at the executing computing server;
    determining, by the one or more processors, a difference between the current snapshot of the session data and a past snapshot of the session data stored by a persistence layer, the past snapshot of the session data being generated by the initiating computing server;
    generating, by the one or more processors, a clone of the session data;
    converting, by the one or more processors, the clone of the session data into a first binary object;
    generating, by the one or more processors, a series comprising the first binary object and a second binary object;
    generating, by the one or more processors, an instruction to update the session attributes stored by the persistence layer by using the series; and
    updating, by the one or more processors to the persistence layer, the session attributes stored by the persistence layer based on the difference between the current snapshot of the session data and the past snapshot of the session data to enable execution of the service of the application without requesting reauthentication.

2. The computer-implemented method of claim 1, wherein updating, by the one or more processors, the session attributes stored by the persistence layer is performed asynchronously with executing the service during the terminal service session.

3. The computer-implemented method of claim 1, further comprising:
    retrieving, by the one or more processors, at least one portion of the session data by loading the terminal service session from the persistence layer and by attaching the at least one portion of the session data to the request.

4. The computer-implemented method of claim 1, further comprising:
   determining, by the one or more processors, that the session attributes are included in a whitelist of modifiable session attributes, and excluded from a blacklist of the modifiable session attributes.

5. The computer-implemented method of claim 1, wherein the past snapshot of the session data was generated by the initiating computing server that processed user credentials to initiate the terminal service session.

6. A non-transitory computer-readable storage medium comprising programming code, which when executed by at least one data processor, causes operations comprising:
   receiving a request to execute, by an executing computing server, a service of an application during a terminal service session initiated by an initiating computing server;
   capturing session data comprising a session header and session attributes, the session data being associated with a session state at the executing computing server and comprising a current snapshot of the session data at the executing computing server;
   determining a difference between the current snapshot of the session data and a past snapshot of the session data stored by a persistence layer, the past snapshot of the session data being generated by the initiating computing server;
   generating a clone of the session data;
   converting the clone of the session data into a first binary object;
   generating a series comprising the first binary object and a second binary object;
   generating an instruction to update the session attributes stored by the persistence layer by using the series; and
   updating the session attributes stored by the persistence layer based on the difference between the current snapshot of the session data and the past snapshot of the session data to enable execution of the service of the application without requesting reauthentication.

7. The non-transitory computer-readable storage medium of claim 6, wherein updating the session attributes stored by the persistence layer is performed asynchronously with executing the service during the terminal service session.

8. The non-transitory computer-readable storage medium of claim 6, wherein the operations further comprise:
   retrieving at least one portion of the session data by loading the terminal service session from the persistence layer and by attaching the at least one portion of the session data to the request.

9. The non-transitory computer-readable storage medium of claim 6, wherein the operations further comprise:
   determining that the session attributes are included in a whitelist of modifiable session attributes and excluded from a blacklist of the modifiable session attributes.

10. The non-transitory computer-readable storage medium of claim 6, wherein the past snapshot of the session data was generated by the initiating computing server that processed user credentials to initiate the terminal service session.

11. A system comprising:
    at least one data processor; and
    at least one memory storing instructions, which when executed by the at least one data processor, cause operations comprising:
    receiving a request to execute, by an executing computing server, a service of an application during a terminal service session initiated by an initiating computing server;
    capturing session data comprising a session header and session attributes, the session data being associated with a session state at the executing computing server and comprising a current snapshot of the session data at the executing computing server;
    determining a difference between the current snapshot of the session data and a past snapshot of the session data stored by a persistence layer, the past snapshot of the session data being generated by the initiating computing server;
    generating a clone of the session data;
    converting the clone of the session data into a first binary object;
    generating a series comprising the first binary object and a second binary object;
    generating an instruction to update the session attributes stored by the persistence layer by using the series; and
    updating the session attributes stored by the persistence layer based on the difference between the current snapshot of the session data and the past snapshot of the session data to enable execution of the service of the application without requesting reauthentication.

12. The system of claim 11, wherein updating the session attributes stored by the persistence layer is performed asynchronously with executing the service during the terminal service session.

13. The system of claim 11, wherein the operations further comprise:
    retrieving at least one portion of the session data by loading the terminal service session from the persistence layer and by attaching the at least one portion of the session data to the request.

14. The system of claim 11, wherein the operations further comprise:
    determining that the session attributes are included in a whitelist of modifiable session attributes and excluded from a blacklist of the modifiable session attributes.

* * * * *